US012542353B2

(12) United States Patent
Wei et al.

(10) Patent No.: US 12,542,353 B2
(45) Date of Patent: Feb. 3, 2026

(54) ELECTRONIC DEVICE AND ANTENNA STRUCTURE

(71) Applicant: WISTRON NEWEB CORPORATION, Hsinchu (TW)

(72) Inventors: Shih-Chiang Wei, Hsinchu (TW); Yung-Chieh Yu, Hsinchu (TW); Hsieh-Chih Lin, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 192 days.

(21) Appl. No.: 18/519,213

(22) Filed: Nov. 27, 2023

(65) Prior Publication Data

US 2024/0266733 A1 Aug. 8, 2024

(30) Foreign Application Priority Data

Feb. 2, 2023 (TW) ................................ 112103560

(51) Int. Cl.
*H01Q 5/378* (2015.01)
*H01Q 5/328* (2015.01)

(52) U.S. Cl.
CPC ............. *H01Q 5/378* (2015.01); *H01Q 5/328* (2015.01)

(58) Field of Classification Search
CPC ........ H01Q 1/243; H01Q 5/328; H01Q 5/378; H01Q 9/42
See application file for complete search history.

(56) References Cited

U.S. PATENT DOCUMENTS 9,627,755 B2 4/2017 Lin
2009/0027294 A1* 1/2009 Bourry ................. H01Q 9/0421 343/848
2013/0154888 A1* 6/2013 Lin ......................... H01Q 5/371 343/745
2017/0047639 A1* 2/2017 Lee .......................... H01Q 1/48
2017/0214120 A1* 7/2017 Lee ........................ H01Q 1/523
2018/0034148 A1* 2/2018 Nam ........................ H01Q 1/50
2018/0375193 A1* 12/2018 Zhang ...................... H01Q 5/35
2020/0028265 A1* 1/2020 Huang ................. H01Q 19/005
2024/0113424 A1* 4/2024 Wei ...................... H01Q 1/2266
(Continued)

FOREIGN PATENT DOCUMENTS

TW 201624840 A 7/2016

*Primary Examiner* — Thien M Le

(74) *Attorney, Agent, or Firm* — McClure, Qualey & Rodack, LLP

(57) ABSTRACT

An electronic device and an antenna structure are provided. The antenna structure includes a grounding element, a feeding radiation element, a feeding element, a switching circuit, and a first parasitic radiation element. The feeding radiation element includes a feeding portion, a first radiating portion, and a second radiating portion. The feeding portion is connected between the first radiating portion and the second radiating portion. The feeding element includes a grounding end and a feeding end. The grounding end is connected to the grounding element. The feeding end is connected to the feeding portion or the second radiating portion. The switching circuit is electrically connected to the grounding element. The first parasitic radiation element includes a first grounding branch and a second grounding branch. The first grounding branch and the second grounding branch are electrically connected to the switching circuit.

18 Claims, 7 Drawing Sheets

(56) References Cited

U.S. PATENT DOCUMENTS

| | | | | |
|---|---|---|---|---|
| 2024/0266733 | A1* | 8/2024 | Wei | H01Q 5/378 |
| 2024/0314991 | A1* | 9/2024 | Manuilov | H01Q 17/002 |
| 2025/0125528 | A1* | 4/2025 | Wei | H01Q 1/243 |

* cited by examiner

ELECTRONIC DEVICE AND ANTENNA STRUCTURE

CROSS-REFERENCE TO RELATED PATENT APPLICATION

This application claims the benefit of priority to Taiwan Patent Application No. 112103560, filed on Feb. 2, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure and an electronic device, and more particularly to an antenna structure capable of covering multiple frequency bands and an electronic device having the antenna structure.

BACKGROUND OF THE DISCLOSURE

Currently, exterior designs of electronic devices, such as notebook computers, are developed toward being thinner and more lightweight, while needing to maintain high levels of performance. Since there is a tendency for an outer appearance of the notebook computer to be designed with a narrow screen frame, an internal space of the notebook computer that is available for placement of an antenna is very limited. Thus, due to the requirement of having a narrow screen frame on the electronic device, an issue of decreasing or insufficient bandwidth is likely to occur in the antenna.

Therefore, how to design an antenna structure capable of simultaneously transmitting and receiving multiple wireless frequency bands and having good antenna efficiency within the limited internal space of the electronic device has become an important issue to be addressed in the related art.

SUMMARY OF THE DISCLOSURE

In response to the above-referenced technical inadequacy, the present disclosure provides an antenna structure and an electronic device, which can address an issue of the antenna structure not having a sufficient bandwidth due to miniaturization requirements of the electronic device.

In order to solve the above-mentioned problem, one of the technical aspects adopted by the present disclosure is to provide an electronic device, which includes a housing and an antenna structure. The antenna structure is disposed on the housing. The antenna structure includes a grounding element, a feeding radiation element, a feeding element, a switching circuit, and a first parasitic radiation element. The feeding radiation element includes a feeding portion, a first radiating portion, and a second radiating portion. The feeding portion is connected between the first radiating portion and the second radiating portion. The feeding element is used to feed a signal. The feeding element includes a grounding end and a feeding end. The grounding end is connected to the grounding element. The feeding end is connected to the feeding portion or the second radiating portion. The switching circuit is electrically connected to the grounding element. The first parasitic radiation element includes a first grounding branch and a second grounding branch. The first grounding branch and the second grounding branch are electrically connected to the switching circuit. A length of the first grounding branch is greater than a length of the second grounding branch. In response to the switching circuit being switched to a first mode, the signal passes through the first grounding branch, and the first radiating portion and the first parasitic radiation element are coupled with each other. In response to the switching circuit being switched to a second mode, the signal passes through the second grounding branch, and the first radiating portion and the first parasitic radiation element are coupled with each other.

In order to solve the above-mentioned problem, another one of the technical aspects adopted by the present disclosure is to provide an antenna structure, which includes a grounding element, a feeding radiation element, a feeding element, a switching circuit, and a first parasitic radiation element. The feeding radiation element includes a feeding portion, a first radiating portion, and a second radiating portion. The feeding portion is connected between the first radiating portion and the second radiating portion. The feeding element is used to feed a signal. The feeding element includes a grounding end and a feeding end. The grounding end is connected to the grounding element. The feeding end is connected to the feeding portion or the second radiating portion. The switching circuit is electrically connected to the grounding element. The first parasitic radiation element includes a first grounding branch and a second grounding branch. The first grounding branch and the second grounding branch are electrically connected to the switching circuit. A length of the first grounding branch is greater than a length of the second grounding branch. In response to the switching circuit being switched to a first mode, the signal passes through the first grounding branch, and the first radiating portion and the first parasitic radiation element are coupled with each other. In response to the switching circuit being switched to a second mode, the signal passes through the second grounding branch, and the first radiating portion and the first parasitic radiation element are coupled with each other.

Therefore, in the electronic device and the antenna structure provided by the present disclosure, by virtue of "the first parasitic radiation element including a first grounding branch and a second grounding branch," "the first grounding branch and the second grounding branch being electrically connected to the switching circuit," and "a length of the first grounding branch being greater than a length of the second grounding branch," the antenna structure can satisfy requirements of multiple frequency bands despite miniaturization of the electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
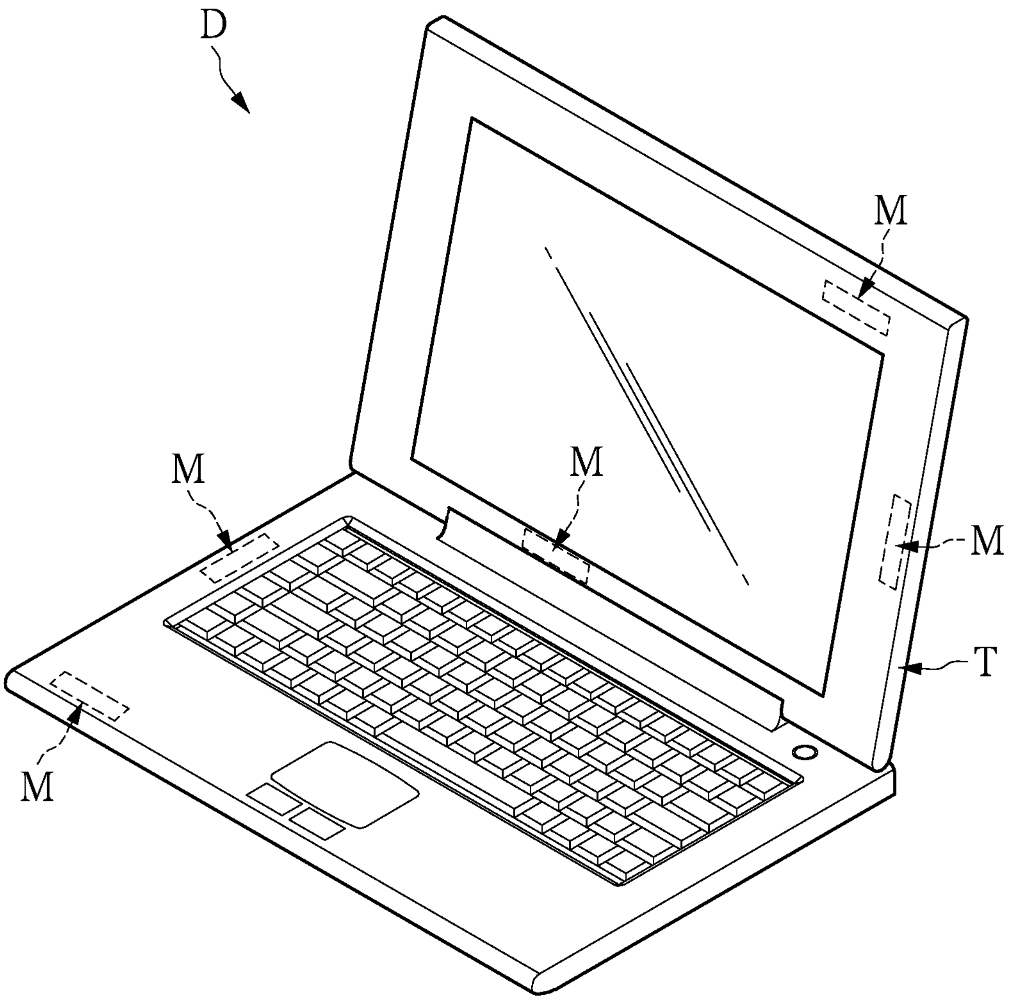
FIG. 1 is a schematic view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

Referring to FIG. 1, FIG. 1 is a schematic view of an electronic device according to the present disclosure. The present disclosure provides an electronic device D, and the electronic device D can be a smart phone, a tablet computer, or a notebook computer. However, the present disclosure is not limited thereto. In the present disclosure, the electronic device D is exemplified as the notebook computer. The electronic device D includes an antenna structure M and a housing T (at least one part of the housing T can be a metal housing). The electronic device D can generate at least one operating frequency band through the antenna structure M. For example, the antenna structure M is disposed at a position of a screen frame of the electronic device D, but the position and quantity of the antenna structure M in the electronic device D are not limited in the present disclosure.

First Embodiment

Figure 2:
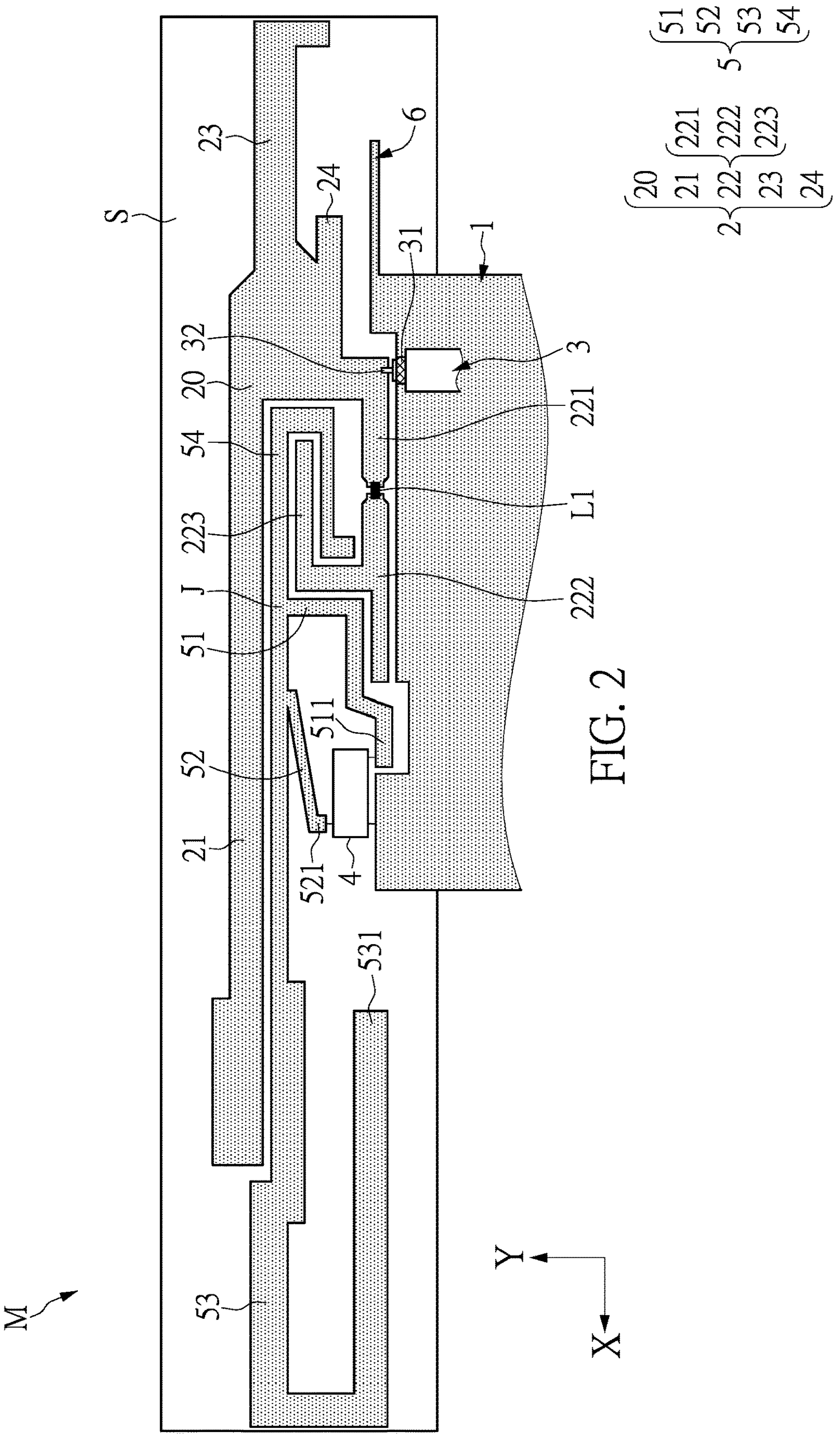
FIG. 2 is a schematic planar view of an antenna structure according to an embodiment of the present disclosure.

Referring to FIG. 2, FIG. 2 is a schematic planar view of an antenna structure according to an embodiment of the present disclosure. The antenna structure M is disposed on a substrate S. The antenna structure M includes a grounding element 1, a feeding radiation element 2, a feeding element 3, a switching circuit 4, and a parasitic radiation element 5. The feeding radiation element 2 includes a feeding portion 20, a first radiating portion 21, and a second radiating portion 22. The feeding portion 20 is connected between the first radiating portion 21 and the second radiating portion 22. The feeding element 3 is used to feed an RF signal. The feeding element 3 includes a grounding end 31 and a feeding end 32. The grounding end 31 is connected to the grounding element 1, and the feeding end 32 is connected to the feeding portion 20 or the second radiating portion 22. In the first embodiment, the feeding end 32 is connected to the second radiating portion 22. The switching circuit 4 is electrically connected to the grounding element 1.

The second radiating portion 22 includes a first branch 221, a second branch 222, and a third branch 223. The first branch 221 is connected to the feeding portion 20, and the third branch 223 is connected to the second branch 222. The antenna structure M further includes a first inductor L1 that is connected between the first branch 221 and the second branch 222. For example, an inductance of the first inductor L1 is 2.7 nH, but the present disclosure is not limited thereto. It is worth mentioning that the feeding end 32 of the feeding element 3 needs to be connected to the first branch 221, but cannot be connected to the second branch 222.

The feeding radiation element 2 further includes a third radiating portion 23 that is connected to the feeding portion 20. The first radiating portion 21 extends along a first direction (a positive X-axis direction), the third radiating portion 23 extends along a second direction (a negative X-axis direction), and the first direction is different from the second direction. Furthermore, the antenna structure M further includes a second parasitic radiation element 6 that is connected to the grounding element 1. The feeding radiation element 2 further includes a fourth radiating portion 24 that is connected to the feeding portion 20. Specifically, as shown in FIG. 2, the fourth radiating portion 24 is located between the third radiating portion 23 and the grounding element 1, and the fourth radiating portion 24 is more adjacent to the grounding element 1 than the third radiating portion 23.

The first parasitic radiation element 5 includes a first grounding branch 51 and a second grounding branch 52. The first grounding branch 51 and the second grounding branch 52 are electrically connected to the switching circuit 4, and the switching circuit 4 is electrically connected to the grounding element 1. The first parasitic radiation element 5 further includes a first extension arm 53 and a second extension arm 54 that are connected to each other. The first grounding branch 51 is connected to a position J connected between the first extension arm 53 and the second extension arm 54, and the second grounding branch 52 is connected to the first extension arm 53.

In the antenna structure M of the present disclosure, at least one radiating portion of the feeding radiation element 2 and the first parasitic radiation element 5 are coupled with each other. For example, the first radiating portion 21 and the first parasitic radiation element 5 are separate from and coupled with each other, and generate operating frequency bands ranging from 617 MHz to 960 MHz and from 3,300 MHz to 4,200 MHz through the switching circuit 4 being switched to different modes. The third branch 223 and the second extension arm 54 are separated from and coupled with each other, and generate operating frequency bands ranging from 1,400 MHz to 1,600 MHz and from 3,300 MHz to 3,800 MHz. The feeding portion 20 and the third radiating portion 23 can be excited to generate an operating frequency band ranging from 2,200 MHz to 2,690 MHz. The fourth radiating portion 24 and the second parasitic radiation element 6 are separated from and coupled with each other, and generate an operating frequency band ranging from 4,200 MHz to 6,000 MHz. The first branch 221, the second branch 222, and the first inductor L1 that is connected between the first branch 221 and the second branch 222 can be excited to generate operating frequency bands ranging from 1,600 MHz to 2,200 MHz and from 5,500 MHz to 6,000 MHz.

Moreover, a length of the first grounding branch 51 is greater than a length of the second grounding branch 52. Thus, in the antenna structure M of the present disclosure, the signal can travel signal coupling paths of different lengths by the switching circuit 4 being switched among different modes, such that the generated operating frequency band can cover a low frequency range of from 617 MHz to 960 MHz. For example, as shown in FIG. 2, when the first radiating portion 21 and the first parasitic radiation element 5 are coupled with each other, a first signal coupling path generated by the first parasitic radiation element 5 extends from a connection portion 511 of the first grounding branch 51 that is connected to the switching circuit 4 to an open end 531 of the first extension arm 53, and a second signal coupling path generated by the first parasitic radiation element 5 extends from a connection portion 521 of the second grounding branch 52 that is connected to the switching circuit 4 to the open end 531 of the first extension arm 53. A length of the first signal coupling path is greater than a length of the second signal coupling path.

Figure 5:
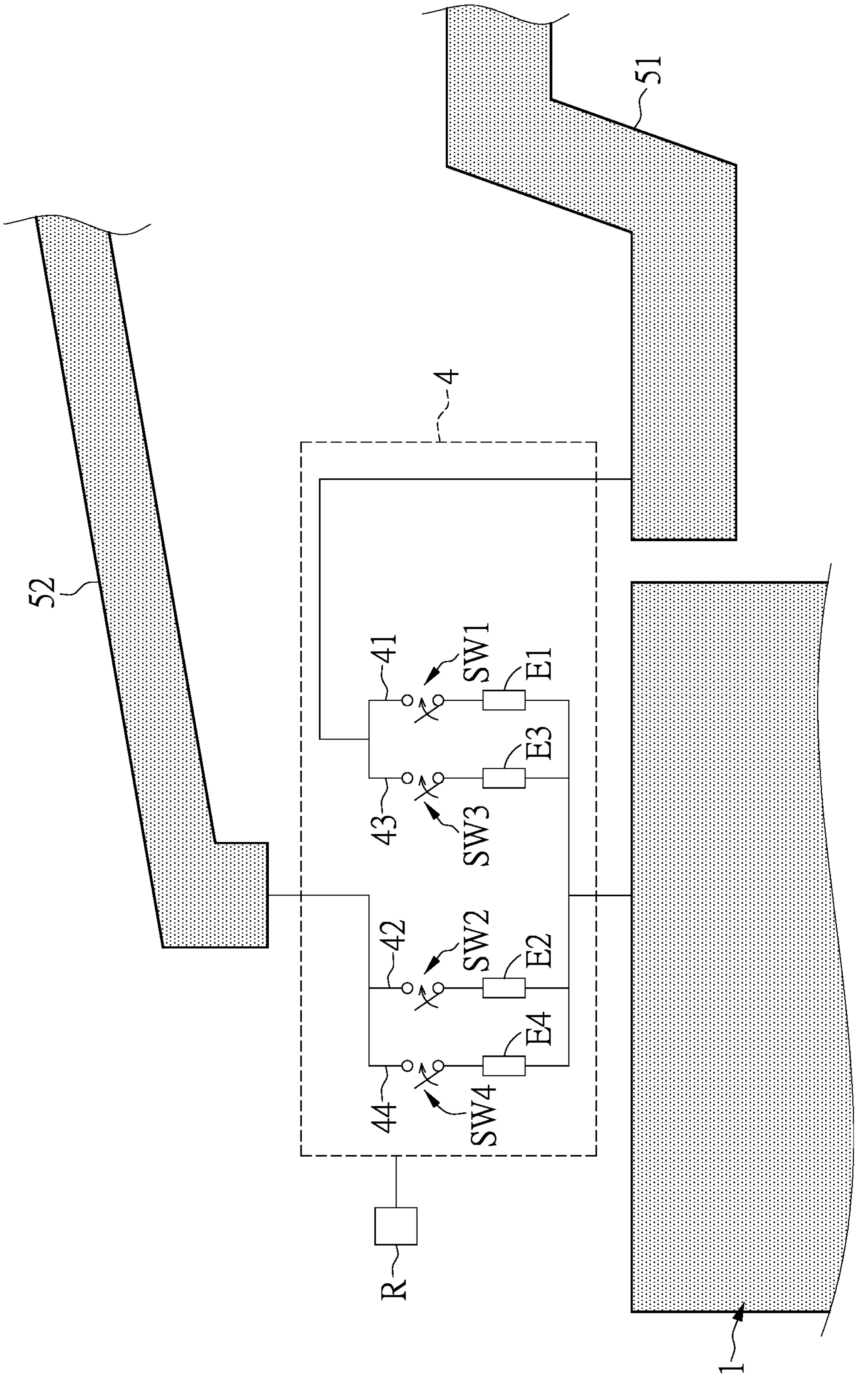
FIG. 5 is a schematic enlarged view of a switching circuit of the antenna structure according to the embodiment of the present disclosure.

Referring to FIG. 5, FIG. 5 is a schematic enlarged view of a switching circuit of the antenna structure according to the embodiment of the present disclosure. The switching circuit 4 includes a first path 41 and a second path 42. The first path 41 has a first switch SW1, and the second path 42 has a second switch 42. An equivalent impedance of the first path 41 is different from an equivalent impedance of the second path 42. An end of the first path 41 is electrically connected to the first grounding branch 51, and another end of the first path 41 is electrically connected to the grounding element 1. An end of the second path 42 is electrically connected to the second grounding branch 52, and another end of the second path 42 is electrically connected to the grounding element 1.

Then, a switching mechanism of the switching circuit 4 among different modes is further described. It should be noted that, when describing one of the modes below, only the switch in a conducting state will be mentioned, and the other switches not mentioned are all in a non-conducting state.

The electronic device D further includes a control circuit R. The control circuit R can control the switches of the switching circuit 4, and switch the switching circuit 4 to one of the modes, so as to adjust the operating frequency band generated by the antenna structure M. For example, in response to the switching circuit 4 being switched to a first mode, the first switch SW1 is in the conducting state. The signal passes through the first grounding branch 51 and is grounded through the first path 41, such that the feeding radiation element 2 is coupled with the first parasitic radiation element 5 to generate a first operating frequency band. On the other hand, in response to the switching circuit 4 being switched to a second mode, the second switch SW2 is in the conducting state. The signal passes through the second grounding branch 52 and is grounded through the second path 42, such that the feeding radiation element 2 is coupled with the first parasitic radiation element 5 to generate a second operating frequency band. A center frequency of the first operating frequency band is lower than a center frequency of the second operating frequency band.

Moreover, the switching circuit 4 is configured to be switched to a third mode. In response to the switching circuit 4 being switched to the third mode, the first switch SW1 and the second switch SW2 are both in the conducting state. Thus, the signal simultaneously passes through the first grounding branch 51 and the second grounding branch 52 and is grounded through the first path 41 and the second path 42, such that the feeding radiation element 2 is coupled with the first parasitic radiation element 5 to generate a third operating frequency band. A center frequency of the third operating frequency band is different from the center frequency of the first operating frequency and the center frequency of the second operating frequency. For example, in the first embodiment, the first operating frequency band includes LTE band 71, the second operating frequency band includes LTE band 8, and the third operating frequency band includes LTE band 28.

It should be noted that the quantity of the paths of the switching circuit 4 is not limited in the present disclosure. As shown in FIG. 5, the switching circuit 4 further includes a third path 43 and a fourth path 44. The third path 43 has a third switch SW3, and the fourth path 44 has a fourth switch SW4. An equivalent impedance of the third path 43 is different from an equivalent impedance of the fourth path 44. An end of the third path 43 is electrically connected to the first grounding branch 51, and another end of the third path 43 is electrically connected to the grounding element 1. An end of the fourth path 44 is electrically connected to the second grounding branch 52, and another end of the fourth path 44 is electrically connected to the grounding element 1.

Through the design of the third path 43 and the fourth path 44, the switching circuit 4 can be further switched to a fourth mode, a fifth mode, and a sixth mode. In response to the switching circuit 4 being switched to the fourth mode, the third switch SW3 is in the conducting state, and the signal passes through the first grounding branch 51 and is grounded through the third path 43, such that the feeding radiation element 2 is coupled with the first parasitic radiation element 5 to generate a fourth operating frequency band. In response to the switching circuit 4 being switched to the fifth mode, the fourth switch SW4 is in the conducting state, and the signal passes through the second grounding branch 52 and is grounded through the fourth path 44, such that the feeding radiation element 2 is coupled with the first parasitic radiation element 5 to generate a fifth operating frequency band.

In response to the switching circuit 4 being switched to the sixth mode, the first switch SW1 and the fourth switch SW4 are both in the conducting state. Thus, the signal simultaneously passes through the first grounding branch 51 and the second grounding branch 52 and is grounded through the first path 41 and the fourth path 44, such that the first radiating portion 21 is coupled with the first grounding branch 51, the second grounding branch 52, and the first extension arm 53 of the first parasitic radiation element 5 to generate a sixth operating frequency band. A center frequency of the fourth operating frequency band is lower than a center frequency of the fifth operating frequency band, and a center frequency of the sixth operating frequency band is different from the center frequency of the fourth operating frequency band and the center frequency of the fifth operating frequency band. For example, the fourth operating frequency band includes LTE band 12, the fifth operating frequency band includes LTE band 5, and the sixth operating frequency band includes LTE band 14.

The aforementioned details are disclosed for exemplary purposes only, and are not meant to limit the scope of the present disclosure. In another embodiment, the switching circuit 4 is configured to be switched to a seventh mode. In response to the switching circuit 4 being switched to the seventh mode, all of the switches (i.e., the first switch SW1, the second switch SW2, the third switch SW3, and the fourth switch SW4) are in the non-conducting state. Thus, the antenna structure M can only generate radiation through the feeding radiation element 2 and the first parasitic radiation element 5, and the operating frequency band generated by the antenna structure M is higher than the first to the sixth operating frequency bands.

The first path 41, the second path 42, the third path 43, and the fourth path 44 are respectively connected to a first passive element E1, a second passive element E2, a third passive element E3, and a fourth passive element E4. The different paths of the switching circuit 4 can achieve different equivalent impedances by connecting to different passive elements. The passive elements (i.e., the first passive element E1, the second passive element E2, the third passive element E3, and the fourth passive element E4) can be inductors, capacitors, or resistors, and the present disclosure is not limited thereto. For example, in the first embodiment, the first passive element E1 and the fourth passive element E4 are resistors having resistances of 0 ohm, the second passive element E2 is an inductor having an inductance of 15 nH, and the third passive element E3 is a capacitor having a capacitance of 33 pF. However, the aforementioned details are disclosed for exemplary purposes only, and are not meant to limit the scope of the present disclosure. Thus, the antenna structure M is able to adjust the operating frequency band, impedance matching, a value of return loss, and the efficiency of radiation through configuration of the first passive element E1, the second passive element E2, the third passive element E3, and the fourth passive element E4.

The signal coupling paths of the antenna structure M can be diversified through the design of the first grounding path 51 and the second grounding path 52, and through switching of the switches (i.e., the first switch SW1, the second switch SW2, the third switch SW3, and the fourth switch SW4). The signal can travel one of the coupling paths, or travel the multiple coupling paths simultaneously, so as to improve the adjustability of the operating frequency band of an antenna and optimize antenna matching. Accordingly, the operating frequency band of the antenna structure M of the present disclosure can cover an LTE full frequency range (from 617 MHz to 5,925 MHz) that includes a low frequency band (from 617 MHz to 960 MHz).

Second Embodiment

Figure 3:
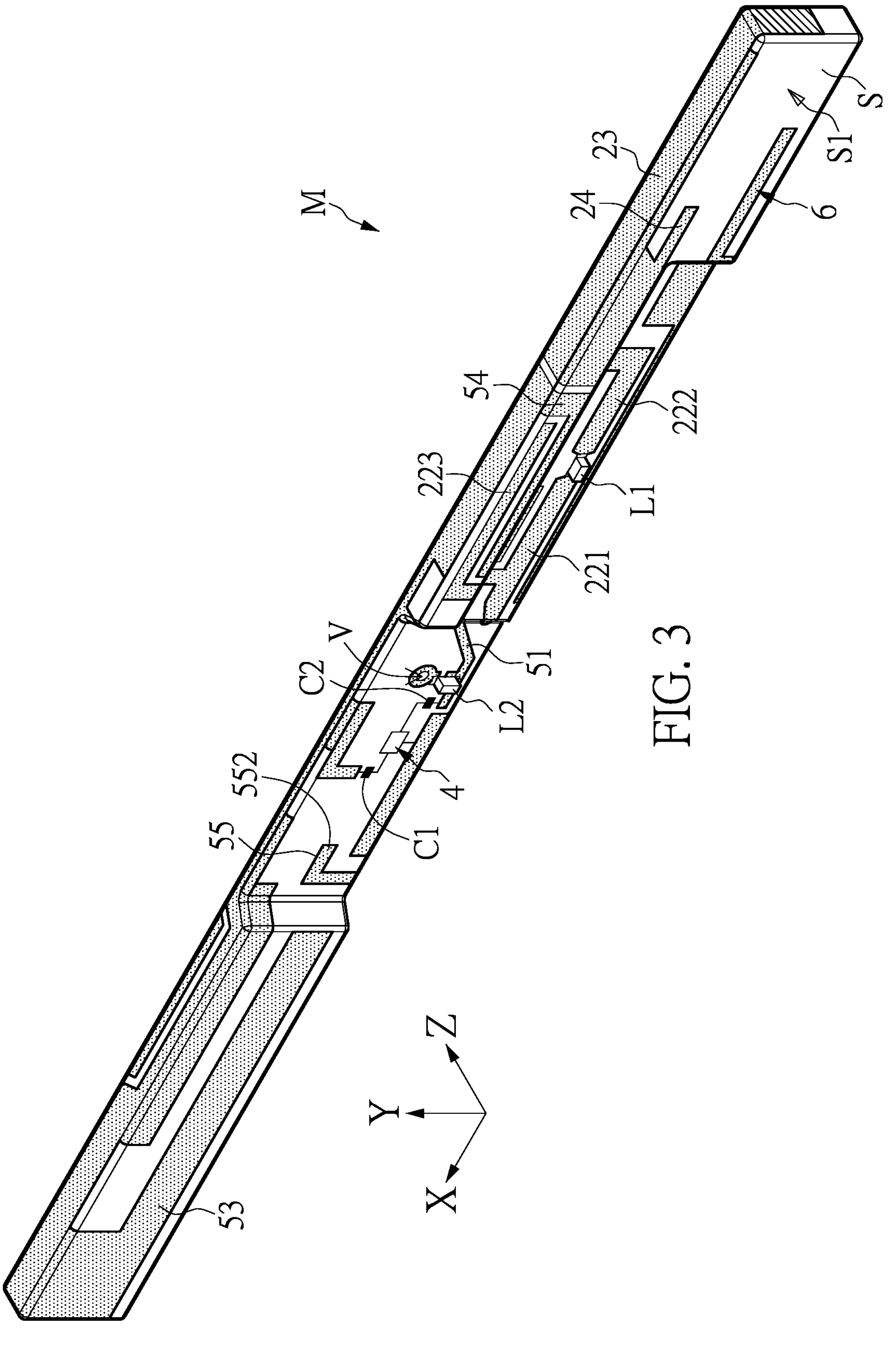
FIG. 3 is a first schematic perspective view of the antenna structure according to the embodiment of the present disclosure.
Figure 4:
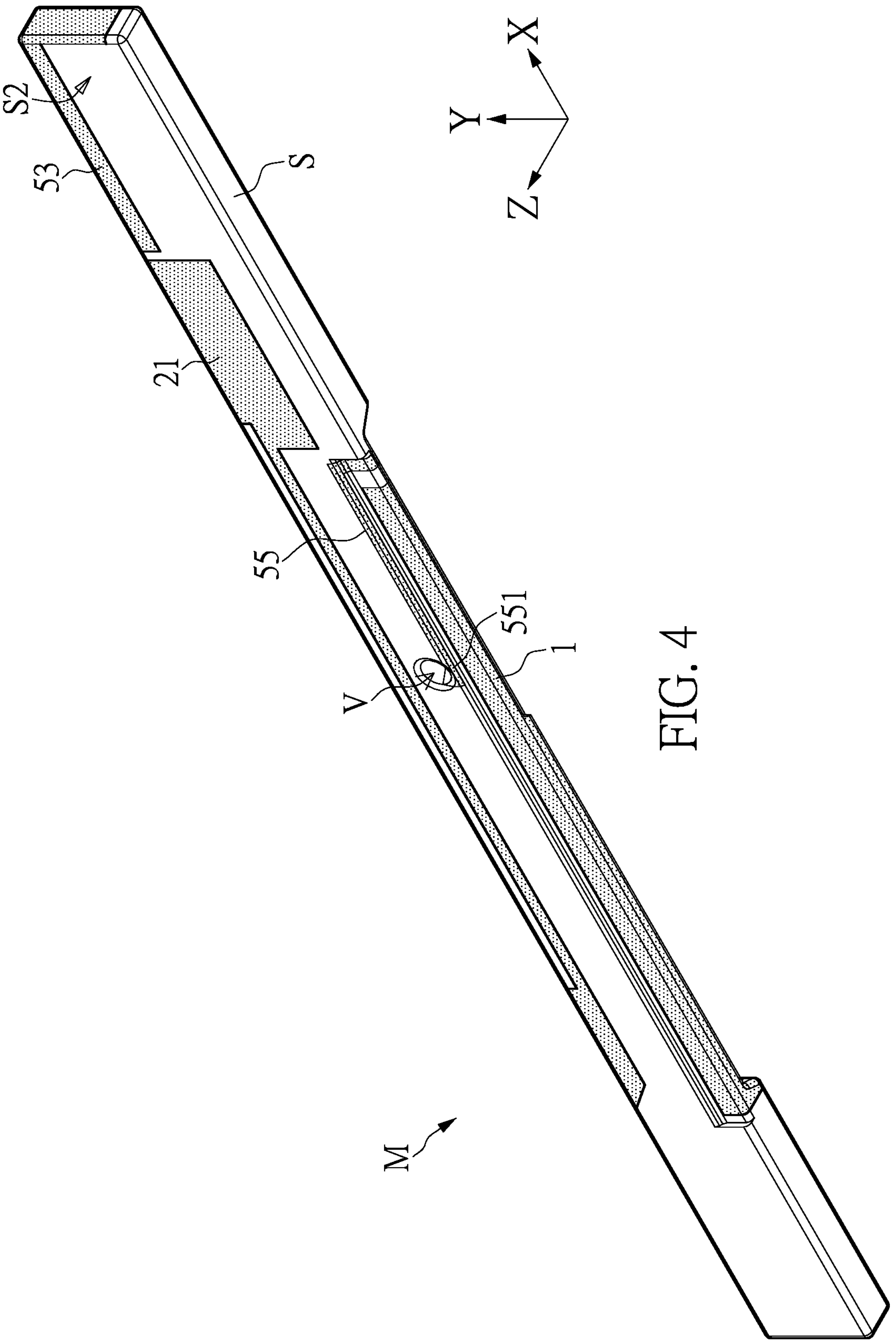
FIG. 4 is a second schematic perspective view of the antenna structure according to the embodiment of the present disclosure.

Referring to FIG. 3 and FIG. 4, FIG. 3 is a first schematic perspective view of the antenna structure according to the embodiment of the present disclosure, and FIG. 4 is a second schematic perspective view of the antenna structure according to the embodiment of the present disclosure. In the second embodiment, the substrate S is a three-dimensional structure. Along a Y-axis, the size of the substrate S of FIG. 3 and FIG. 4 is obviously smaller than that of the substrate S of FIG. 2. The antenna structure M of the second embodiment has a structure similar to that of the first embodiment, and the similarities therebetween will not be reiterated herein. In order to fully exhibit all of the radiation elements of the antenna structure M, the feeding element 3 is omitted from FIGS. 3 and 4.

Figure 6:
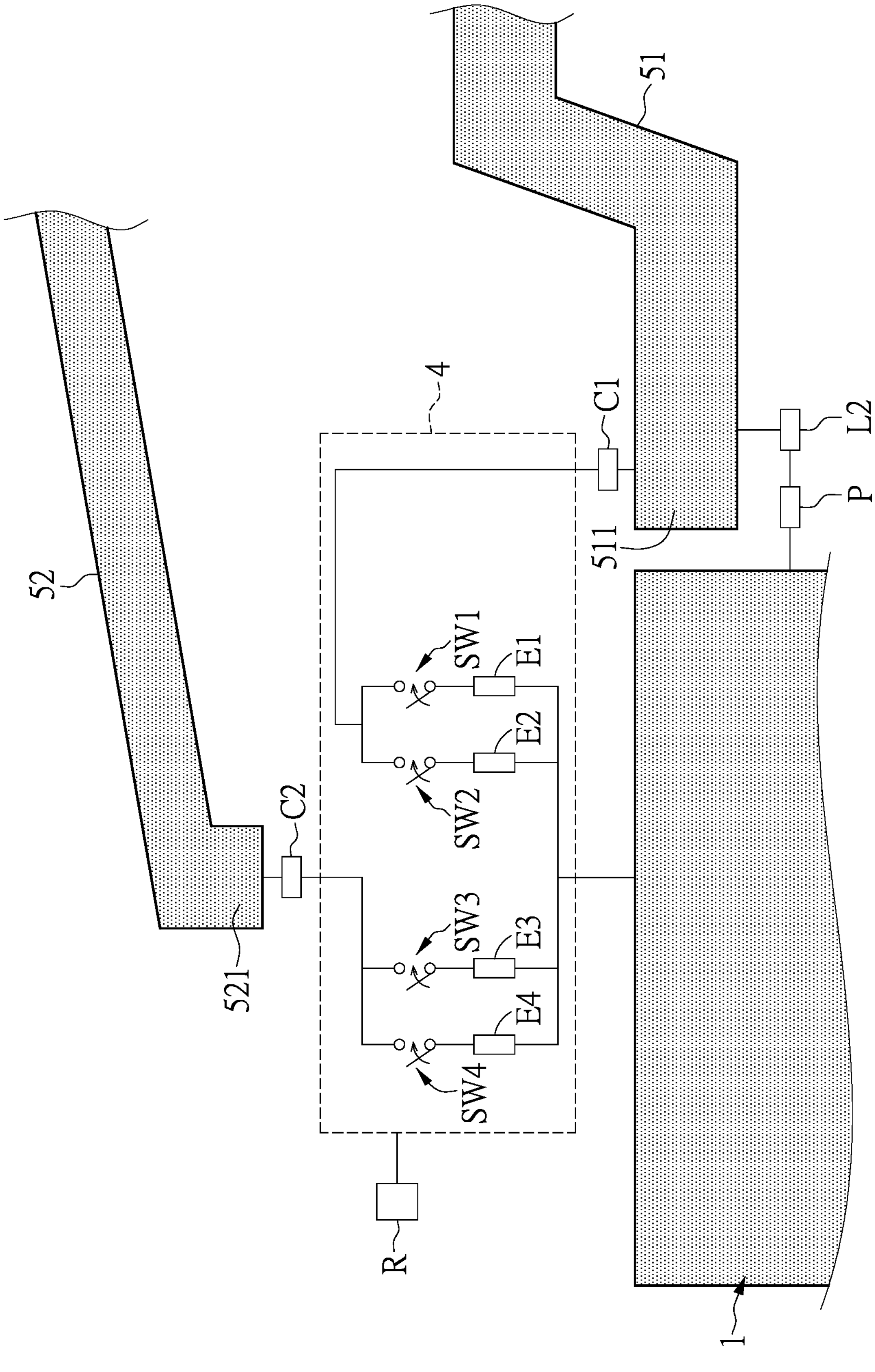
FIG. 6 is a schematic enlarged view of the switching circuit and a proximity sensing circuit of the antenna structure according to the embodiment of the present disclosure.

Referring to FIG. 6, FIG. 6 is a schematic enlarged view of the switching circuit and a proximity sensing circuit of the antenna structure according to the embodiment of the present disclosure. The electronic device D further includes a proximity sensing circuit P. The proximity sensing circuit P can be applied to the antenna structure M shown in FIG. 3 and FIG. 4 (the proximity sensing circuit P is not shown in FIG. 3 and FIG. 4). The proximity sensing circuit P can be, for example, a capacitance sensing circuit. The first parasitic radiation element 5 can be used as a sensing electrode for the proximity sensing circuit P to measure the capacitance. The connection relationship between the proximity sensing circuit P and the antenna structure M is shown in FIG. 6.

Specifically, the antenna structure M further includes a second inductor 2, a first capacitor C1, and a second capacitor C2. The proximity sensing circuit P is electrically connected between the first grounding branch 51 and the grounding element 1, and the proximity sensing circuit P is further electrically connected to a mainboard (not shown in the figures). The second inductor L2 is electrically connected between the first grounding branch 51 and the proximity sensing circuit P, the first capacitor C1 is electrically connected between the first grounding branch 51 and the switching circuit 4, and the second capacitor C2 is electrically connected between the second grounding branch 52 and the switching circuit 4. The position of each of the first capacitor C1 and the second capacitor C2 is not limited in the present disclosure. In other embodiments, the first capacitor C1 and the second capacitor C2 can be disposed in the switching circuit 4. The second inductor L2 can serve as an RF choke to prevent the RF signal generated by the feeding element 3 from flowing into the proximity sensing circuit P. The first capacitor C1 and the second capacitor C2 can serve as DC blocks to prevent a DC signal generated by the proximity sensing circuit P from flowing to ground through the switching circuit 4. For example, an inductance of the second inductor L2 is 56 nH, and capacitances of the first capacitor C1 and the second capacitor C2 are 47 pF. However, the present disclosure is not limited thereto. Moreover, the connection portion 511 connected between the proximity sensing circuit P and the first grounding branch 51 is more adjacent to the grounding element 1 than the second grounding branch 52, so as to reduce influences of the proximity sensing circuit P on antenna characteristics of the antenna structure M.

The specific position of the proximity sensing circuit P is not limited in the present disclosure. For example, the proximity sensing circuit P can be integrated into the switching circuit 4. The proximity sensing circuit P can also be independently disposed outside the switching circuit 4, such as being disposed on the substrate S of the antenna structure M or adjacent to the antenna structure M. Alternatively, the proximity sensing circuit P can be independently disposed on the mainboard.

It should be noted that, in the implementations of FIG. 3 and FIG. 4, the proximity sensing circuit P cannot be placed directly adjacent to the first grounding branch 51 due to the limitation of internal design requirements of the electronic device D. Thus, a conductive via V is formed on a first surface S1 of the substrate S and adjacent to the first grounding branch 51, and the conductive via V penetrates through the substrate S. The conductive via V can be electrically connected through an extension branch 55. A first end 551 of the extension branch 55 is disposed on a second surface S2 of the substrate S and electrically connected to the conductive via V, and a second end 552 of the extension branch 55 extends from the second surface S2 to the first surface S1. Therefore, the proximity sensing circuit P can be electrically connected to the second end 552 of the extension branch 55. An end of the proximity sensing circuit P is grounded and electrically connected to the antenna structure M through the second end 552 of the extension branch 55. The first parasitic radiation element 5 of the antenna structure M can be used as a sensing electrode (i.e., a sensor pad) of the proximity sensing circuit P, such that the proximity sensing circuit P can measure a distance between an object (such as the leg or other body parts of a user) and the antenna structure M. In addition, a sensing signal detected by the proximity sensing circuit P through the sensing electrode will be sent back to the mainboard. In this way, the electronic device D can be used to sense whether or not the human body is in close proximity of the antenna structure M, and the radiation power transmitted by an RF module (not shown in the figures) on the mainboard to the antenna can be adjusted, thereby preventing a specific absorption rate (SAR) at which electromagnetic wave energy is absorbed per unit mass by an organism from being too high.

Beneficial Effects of the Embodiments

Figure 7:
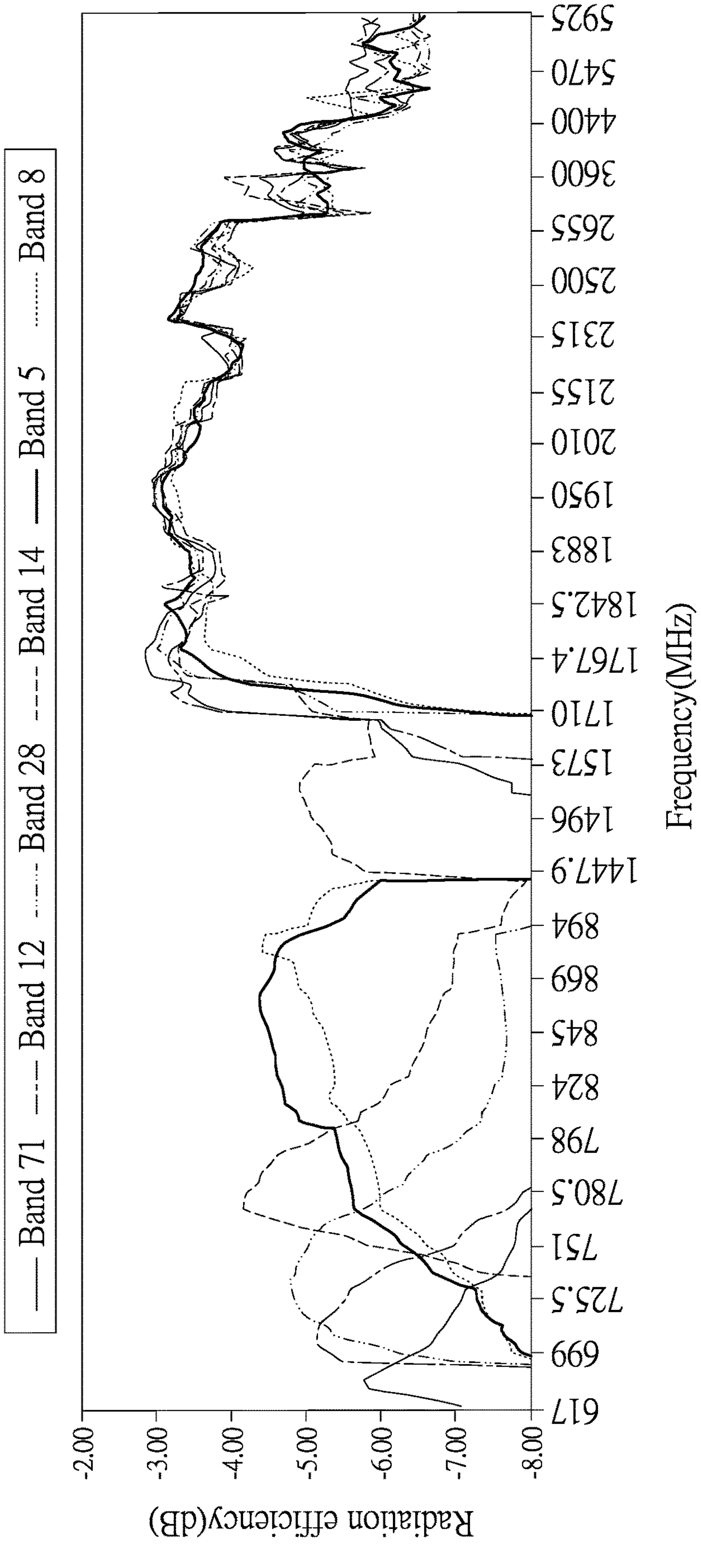
FIG. 7 is a curve diagram showing radiation efficiency of the antenna structure according to the embodiment of the present disclosure.

In conclusion, in the electronic device D and the antenna structure M provided by the present disclosure, by virtue of "the first parasitic radiation element 5 including a first grounding branch 51 and a second grounding branch 52," "the first grounding branch 51 and the second grounding branch 52 being electrically connected to the switching circuit 4," and "a length of the first grounding branch 51 being greater than a length of the second grounding branch 52," the signal can travel the signal coupling paths of different lengths by the switching circuit 4 being switched among different modes. Accordingly, the operating frequency band of the antenna structure M of the present disclosure can include the low frequency band (from 617 MHz to 960 MHz). Referring to FIG. 7, FIG. 7 is a curve diagram showing radiation efficiency of the antenna structure according to the embodiment of the present disclosure. Through the design of the antenna structure M of the present disclosure, the operating frequency band of the antenna structure M can cover the LTE full frequency range (from 617 MHz to 5,925 MHz) that includes the low frequency band (from 617 MHz to 960 MHz). Furthermore, while the low frequency band is being adjusted by the switching circuit 4, variation of medium and high frequency bands is small, and good radiation efficiency can be maintained.

In addition, the signal coupling paths of the antenna structure M can be diversified through the design of the first grounding path 51 and the second grounding path 52, and through switching of the switches (i.e., the first switch SW1, the second switch SW2, the third switch SW3, and the fourth switch SW4). The signal can travel one of the coupling paths, or travel the multiple coupling paths simultaneously, so as to improve the adjustability of the operating frequency band of the antenna and optimize the antenna matching. Thus, the antenna structure M of the present disclosure can be used as a main antenna and can meet more stringent antenna characteristic requirements.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a housing; and an antenna structure disposed on the housing and including:

a grounding element;

a feeding radiation element including a feeding portion, a first radiating portion, and a second radiating portion, wherein the feeding portion is connected between the first radiating portion and the second radiating portion;

a feeding element being used to feed a signal, wherein the feeding element includes a grounding end and a feeding end, the grounding end is connected to the grounding element, and the feeding end is connected to the feeding portion or the second radiating portion;

a switching circuit electrically connected to the grounding element; and a first parasitic radiation element including a first grounding branch and a second grounding branch, wherein the first grounding branch and the second grounding branch are electrically connected to the switching circuit, a length of the first grounding branch is greater than a length of the second grounding branch, and the first parasitic radiation element and the feeding radiation element are coupled with each other;

wherein, in response to the switching circuit being switched to a first mode, the signal passes through the first grounding branch, and in response to the switching circuit being switched to a second mode, the signal passes through the second grounding branch.

2. The electronic device according to claim 1, wherein the switching circuit includes a first path and a second path, the first path has a first switch, and the second path has a second switch; wherein, in response to the switching circuit being switched to the first mode, the first switch is in a conducting state, and in response to the switching circuit being switched to the second mode, the second switch is in the conducting state; wherein an equivalent impedance of the first path is different from an equivalent impedance of the second path.

3. The electronic device according to claim 2, wherein the switching circuit is configured to be switched to a third mode; wherein, in response to the switching circuit being switched to the third mode, the first switch and the second switch are both in the conducting state, and the signal passes through the first grounding branch and the second grounding branch.

4. The electronic device according to claim 1, wherein the first parasitic radiation element further includes a first extension arm and a second extension arm connected to each other, the first grounding branch is connected to a connection position between the first extension arm and the second extension arm, and the second grounding branch is connected to the first extension arm.

5. The electronic device according to claim 4, wherein the antenna structure further includes a first inductor, the second radiating portion further includes a first branch, a second branch, and a third branch, the first branch is connected to the feeding portion, the first inductor is connected between the first branch and the second branch, the third branch is connected to the second branch, and the third branch and the second extension arm are separate from and coupled with each other.

6. The electronic device according to claim 1, wherein the feeding radiation element further includes a third radiating portion, the third radiating portion is connected to the feeding portion, the first radiating portion extends along a first direction, the third radiating portion extends along a second direction, and the first direction is different from the second direction.

7. The electronic device according to claim 6, wherein the antenna structure further includes a second parasitic radiation element, and the second parasitic radiation element is connected to the grounding element; wherein the feeding radiation element further includes a fourth radiating portion, the fourth radiating portion is connected to the feeding portion, the fourth radiating portion is more adjacent to the grounding element than the third radiating portion, and the fourth radiating portion and the second parasitic radiation element are separate from and coupled with each other.

8. The electronic device according to claim 1, further comprising a proximity sensing circuit electrically connected to the first grounding branch, wherein the antenna structure further includes a second inductor, a first capacitor, and a second capacitor, the second inductor is electrically connected between the first grounding branch and the proximity sensing circuit, the first capacitor is electrically connected between the first grounding branch and the switching circuit, and the second capacitor is electrically connected between the second grounding branch and the switching circuit.

9. The electronic device according to claim 8, wherein a connection portion between the proximity sensing circuit and the first grounding branch is more adjacent to the grounding element than the second grounding branch.

10. An antenna structure, comprising:

a grounding element;

a feeding radiation element including a feeding portion, a first radiating portion, and a second radiating portion, wherein the feeding portion is connected between the first radiating portion and the second radiating portion;

a feeding element being used to feed a signal, wherein the feeding element includes a grounding end and a feeding end, the grounding end is connected to the grounding element, and the feeding end is connected to the feeding portion or the second radiating portion;

a switching circuit electrically connected to the grounding element; and a first parasitic radiation element including a first grounding branch and a second grounding branch, wherein the first grounding branch and the second grounding branch are electrically connected to the switching circuit, a length of the first grounding branch is greater than a length of the second grounding branch, and the first parasitic radiation element and the feeding radiation element are coupled with each other;

wherein, in response to the switching circuit being switched to a first mode, the signal passes through the first grounding branch, and in response to the switching circuit being switched to a second mode, the signal passes through the second grounding branch.

11. The antenna structure according to claim 10, wherein the switching circuit includes a first path and a second path, the first path has a first switch, and the second path has a second switch; wherein, in response to the switching circuit being switched to the first mode, the first switch is in a conducting state, and in response to the switching circuit being switched to the second mode, the second switch is in a conducting state; wherein the equivalent impedance of the first path is different from the equivalent impedance of the second path.

12. The antenna structure according to claim 11, wherein the switching circuit is configured to be switched to a third mode, and in response to the switching circuit is switched to the third mode, the first switch and the second switch are both in conducting states, and the signal passes through the first grounding branch and the second grounding branch.

13. The antenna structure according to claim 10, wherein the first parasitic radiation element further includes a first extension arm and a second extension arm connected to each other, the first grounding branch is connected to a position connected between the first extension arm and the second extension arm, and the second grounding branch is connected to the first extension arm.

14. The antenna structure according to claim 13, further comprising a first inductor, wherein the second radiating portion further includes a first branch, a second branch, and a third branch, the first branch is connected to the feeding portion, the first inductor is connected between the first branch and the second branch, the third branch is connected to the second branch, and the third branch and the second extension arm are separated from and coupled with each other.

15. The antenna structure according to claim 10, wherein the feeding radiation element further includes a third radiating portion, the third radiating portion is connected to the feeding portion, the first radiating portion extends along a first direction, the third radiating portion extends along a second direction, and the first direction is different from the second direction.

16. The antenna structure according to claim 15, further comprising a second parasitic radiation element, wherein the second parasitic radiation element is connected to the grounding element; wherein the feeding radiation element further includes a fourth radiating portion, the fourth radiating portion is connected to the feeding portion, the fourth radiating portion is more adjacent to the grounding element than the third radiating portion, and the fourth radiating portion and the second parasitic radiation element are separated from and coupled with each other.

17. The antenna structure according to claim 10, further comprising a second inductor, a first capacitor, and a second capacitor, wherein the antenna structure is configured to be electrically connected to a proximity sensing circuit, the proximity sensing circuit is electrically connected to the first grounding branch, the second inductor is electrically connected between the first grounding branch and the proximity sensing circuit, the first capacitor is electrically connected between the first grounding branch and the switching circuit, and the second capacitor is electrically connected between the second grounding branch and the switching circuit.

18. The antenna structure according to claim 17, wherein a connection portion connected between the proximity sensing circuit and the first grounding branch is more adjacent to the grounding element than the second grounding branch.

* * * * *